United States Patent Office 3,068,188
Patented Dec. 11, 1962

3,068,188
COMPOSITION COMPRISING A SYNTHETIC LINEAR POLYMER, ORGANIC SOLVENT, AND AN INORGANIC SALT
Lawrence F. Beste and Curtis Wayne Stephens, Wilmington, Del., assignors to E. I. du Pont de Nemours and Company, Wilmington, Del., a corporation of Delaware
No Drawing. Filed Mar. 27, 1957, Ser. No. 648,768
12 Claims. (Cl. 260—30.2)

The present invention relates to a novel and useful composition of matter and to an improved process for forming such a composition. More particularly, it relates to an improved polymer solution and to an improved method for forming a polymer solution.

Many polymers are now known which have a combination of physical and chemical properties which make them well suited for the formation of various shaped articles such as filaments, yarns, films, tubes, and the like. One disadvantage of many of these polymers, however, is the fact that they have limited solubility in the usual solvents which makes it difficult to economically produce these shaped articles by the conventional casting procedures or extrusion processes such as wet- or dry-spinning. A solvent which would dissolve substantial portions of these polymers would obviously be highly desirable since it would materially reduce the amount of solvent required by these conventional processes.

It is an object of the present invention, therefore, to provide an improved composition of matter. Another object is the preparation of a polymer solution in which the polymer concentration is substantially increased. A further object is to provide a spinning solution which contains a high concentration of polymer. A still further object is to provide a process for the formation of an improved polymer solution. Other objects will appear hereinafter.

These objects are accomplished by the present invention which provides a liquid composition of matter comprising a solution of a polymer, a solvent, and a salt; the said polymer being selected from the group consisting of a polyamide, a polyurethane, a polyurea, and a polyureylene, having a solubility at 20° C. of at least 0.5% by weight in the said solvent and being of such structure that a major proportion of the recurring units in the polymer contain an arylene nucleus directly connected to two nitrogen atoms in the chain; the said solvent being a member selected from the group consisting of dimethylformamide, dimethylacetamide, N-methyl-2-pyrrolidone, dimethylsulfoxide; and the said salt being so chosen that it is sufficiently soluble in the said solvent and liberates an ion of a halogen atom having an atomic number of from 16 to 36 (i.e., the chloride and bromide anion) to such an extent that a solution of $\frac{1}{100}$ of an equivalent of tthe salt in one liter of the said solvent has a specific resistance of less than about 5000 ohm-centimeters at 20° C. By "a major proportion" is meant that the polymer chain is composed of at least about 50% of the defined structural units. The term "direcly connected" is used to signify that each such nitrogen atom in the chain is bonded to a nuclear atom. The term "specific resistance" denotes the resistance in ohms of 1 cubic centimeter of the material (salt/solvent solution) at a particular temperature (20° C.) and it is measured in the conventional manner such as by the procedure set forth in "Experimental Physical Chemistry," by Daniels, Matthews and Williams, 3rd Edition (1941), pages 175 to 180.

The polymers which are most useful in the practice of this invention are those which have the desired solubility and are composed of at least 50% of the following recurring structural units

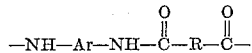

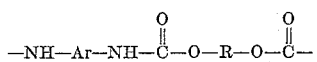

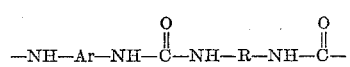

and

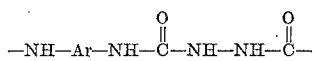

wherein Ar is an arylene nucleus and R is either an alkylene or an arylene radical. Either Ar or R may contain substituent groups and still be useful in the practice of this invention. In addition, the polymers of this invention may contain mixtures of the above recurring units and blends of two or more of these polymers may also be used. When forming the polymers, therefore, one must merely select the proper reactants so that a major proportion of the polymeric chain is composed of the designated structural units.

In one of the preferred embodiments of this invention a wholly aromatic polyamide containing the recurring structural unit

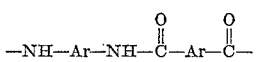

wherein Ar is a phenylene nucleus, is dissolved in one of the said solvents with lithium or calcium chloride as the salt to give a solution which is suitable for the spinning of fibers or the casting of films.

In order to produce the compositions of matter of the present invention, it is merely necessary to select a polymer falling within the defined class and determine whether or not it is soluble to the extent of 0.5% by weight in the solvent (without the salt). If it is soluble to this extent in the solvent, any salt which dissociates in the solvent so as to liberate a bromide or chloride ion to the desired extent will materially increase the solubility of the polymer in the said solvent. The degree of dissociation is measured in terms of specific resistance by the method discussed in "Textbook of Physical Chemistry," by Samuel Glasstone, second edition, published April 1946, by D. Van Nostrand Company, Inc. (New York), on pages 888 to 892. After these determinations, the liquid compositions of matter of the present invention are formed by merely suspending the polymer, copolymer or blends of the polymers in the salt/solvent solution, although in some instances it may be desirable that the mixture be both heated and stirred in order to hasten the dissolving action of the salt/solvent solution.

The invention will now be further described in the following specific examples which are to be regarded solely as illustrative and not as restricting the scope of the invention.

*Examples*

The polymers in the following tables are prepared by reacting equimolar amounts of the two indicated reactants at room temperature. The resulting polymer is then stirred in the solvent at room temperature to determine the solubility. The specific resistances (S.RR.) was measured in accordance with the procedure set forth in "Experimental Physical Chemistry," by Daniels, Matthews and Williams, third edition (1941), pages 175 to 180.

| Ex. | Polymer reactants | Polymer type | Inherent viscosity at 20° C. | Solvent | Salt | Salt conc. g./100 ml. of solvent | Salt to polymer ratio | Polymer solubility (g./100 ml. of solvent) | | S. R. of 1/100 eq. salt (ohm-cm) |
|---|---|---|---|---|---|---|---|---|---|---|
| | | | | | | | | Without salt | With salt | |
| 1 | m-phenylene diamine and isophthaloyl chloride. | Polyamide | 0.98 in conc. H₂SO₄. | Dimethylacetamide. | LiCl | 2.1 | 0.105 | 5 | 20 | 2,600 |
| 2 | do | do | do | do | LiBr | 4.35 | 0.23 | 5 | 15 | 2,850 |
| 3 | do | do | do | do | CaCl₂ | 5.55 | 0.23 | 5 | 20 | 3,600 |
| 4 | do | do | do | Dimethylformamide. | LiCl | 5.3 | 0.35 | 3 | 15 | 1,750 |
| 5 | do | do | do | N-methyl pyrrolidone. | LiCl | 2.1 | 0.105 | 5 | 20 | 3,800 |
| 6 | do | do | do | Dimethylsulfoxide. | CaCl₂ | 4.0 | 0.40 | 2 | 10 | 4,000 |
| 7 | m-Phenylene diamine and sebacyl chloride. | do | 0.51 in conc. H₂SO₄ | Dimethylformamide. | LiCl | 2.5 | 0.83 | 0.5–1.0 | 3.0 | 1,750 |
| 8 | 2,5-dimethyl piperazine and 2,6-toluene di-isocyanate. | Polyurea | 0.70 in m-cresol | Dimethylacetamide. | LiCl | 4.0 | 0.27 | 0.5–1.0 | 15 | 2,600 |
| 9 | Bis(p-aminophenyl)methane and the bischloroformate of 4,4' diphenylolpropane. | Polyurethane | 0.23 in hexamethylenephosphoramide | Dimethylformamide. | LiCl | 4.0 | 0.40 | 0.5–1.0 | 10 | 1,750 |
| 10 | Polymer ¹ | Polyureylene | 0.88–0.98 in conc. H₂SO₄ | Dimethylacetamide. | LiCl | 5.0 | 0.2 | Gels | 20 | 2,000 |
| 11 | m-Phenylene diamine and isophthaloyl chloride | Polyamide | 0.98 in conc. H₂SO₄ | do | NaSCN | 4.05 | 0.81 | 5 | 5 | 3,000 |
| 12 | do | do | do | do | KCl | Ins. | | 5 | 5 | |
| 13 | do | do | do | Formic acid | LiCl | 5.0 | | Ins. | Ins. | |
| 14 | do | do | do | Trifluoroacetic acid. | LiCl | 5.0 | | Ins. | Ins. | |
| 15 | do | do | do | Dimethylacetamide. | ZnCl₂ | 0.5 | 0.1 | 5 | 5 | >50,000 |

Examples 1 through 10 in the above table show some of the preferred embodiments of the present invention. Examples 11 through 15 shown other compositions which demonstrate the necessity of adhering to the specific conditions of these compositions. Example 11 thus shows that even when the specific resistance of the salt/solvent solution is within the required limits and the polymer is soluble in the solvent without a salt to the desired extent, the desired increased solubility will still not be obtained if the selected salt does not liberate the bromide or chloride ions as stipulated. Example 12 discloses the inoperability of a salt which will not dissolve sufficiently to give the desired ion concentration. Examples 13 and 14 show that unless the polymer is soluble in the solvent without the salt, the increased solubility will not be obtained and Example 15 shows that the desired increased polymer concentration will not be obtained if the salt/solvent solution has greater than the required specific resistance.

While the applicant does not wish to be limited to any theory regarding the increased solubility of these polymers in a salt/solvent solution, there is conclusive scientific evidence to the effect that a soluble complex is formed between the polymer and the salt. This theory is proven by the following physical-chemical measurements:

(1) Electrophoresis measurements which are discussed in some detail in "Textbook of Physical Chemistry," by S. Glasstone, second edition, D. Van Nostrand and Company, Inc., New York (1946), beginning on page 1238, and also "Colloid Science," edited by H. R. Kruyt, published by the Elsever Publishing Company, Amsterdam, 1952, volume I, page 207, and volume II, page 193.

(2) Electrolytic conductance which is discussed in "Textbook of Physical Chemistry," by S. Glasstone, second edition, D. Van Nostrand and Company, Inc., chapter XII.

(3) The measurement based on the partition of the salt of the negative ion between two solutions separated by a permeable membrane such as discussed in "Textbook of Physical Chemistry," by S. Glasstone, second edition, D. Van Nostrand and Company, Inc., on pages 1259 and 1261.

When the compositions of Examples 1 through 10 in the table are measured by the above methods, the measurements clearly show a complex to be formed. The same measurements, however, when carried out on the compositions of Examples 11 through 15 show that a complex is not formed.

The present invention, therefore, provides a novel and useful complex organic compound formed between a polymer and a salt in the presence of an organic solvent; the said polymer being selected from the group consisting of a polyamide, a polyurethane, a polyurea, and a polyureylene, having a solubility at 20° C. of at least 0.5% by weight in the said solvent and being of such structure that a major proportion of the recurring units in the polymer contain an arylene nucleus directly connected to two nitrogen atoms in the chain; the said salt being so chosen that it is sufficiently soluble in the said solvent and liberates an anion selected from the group consisting of chloride and bromide to such an extent that a solution of 1/100 of an equivalent of the salt in one liter of the said solvent has a specific resistance of less than about 5000 ohm-centimeters at 20° C.; and the said solvent being a member selected from the group consisting of dimethylformamide, dimethylacetamide, N-methyl-2-pyrrolidone, and dimethylsulfoxide. There is also provided an improved method for preparing such a polymer solution which comprises the addition of these salts to the solvent for the purpose of increasing the solubility of the polymer.

Among the polymers which may be used in the practice of this invention are those formed from m-phenylene diamine and adipyl chloride; bis(p-aminophenyl)methane and isophthaloyl chloride; p-phenylene diamine and the bischloroformate of 2,2-dimethyl-1,3-propanediol; 2,2-bis(p-aminophenyl)propane and the bischloroformate of ethylene glycol; p-phenylene diamine and 2,6-toluene diisocyanate; m-phenylene diamine and 1,6-hexamethylene diisocyanate; and the polyureylenes such as formed in Example 10 using other molecular weight oxides, other diisocyanates and other diamines. The complex forms with each of the defined polymers and increases its solubility in these solvents so that the salts may be used with any of these polymers without regard to their molecular weight. It is preferred, however, that they be used with polymers which have an inherent viscosity of at least 0.6 so that the resulting shaped structure will be composed of a polymer of high molecular weight.

The salts which may be used are those which are sufficiently soluble in and liberate either the chloride or bromide ion to such an extent that a solution of 1/100 equivalent of the salt in one liter of the solvent has a specific resistance of less than about 5000 ohm-centimeters at 20° C. Examples of such salts which have been found to be effective in one or more of the solvents indicated are CaBr$_2$, NaBr, NH$_4$Br, MgCl$_2$ and SrCl$_2$. In general a salt concentration of about 0.2 to about 10% by weight of salt to solvent is employed in the practice of this invention. Higher or lower amounts of salt, however, may be used depending upon the particular polymer and solvent employed. When very minute quantities of salt are used, no subsequent treating step is necessary after the formation of the shaped article since the salt concentration in the shaped article is so low as to be negligible. When using a higher amount of salt a subsequent leaching step is generally employed to remove any surplus salt from the shaped article.

The solutions of this invention may be used in any manner where standard polymer solutions are employed. The solution may thus be wet- or dry-spun into textile fibers, ribbons, etc., or used for the casting of films by conventional processes. When the polymer solution is wet-spun it is preferred that the spinning bath contain a solvent for the salt so that a portion of the salt will be leached from the extruded polymer and that the resulting structure will have a very low salt content.

A dyestuff or pigment may also be mixed into the polymer solution in order to produce colored structures.

Many modifications will be apparent to those skilled in the art from the reading of the above without a departure from the inventive concept.

What is claimed is:

1. A liquid composition of matter comprising a solution of (A) from about 3.0 to about 20% by weight based on the liquid present of a synthetic linear polymer having an inherent viscosity of at least about 0.5 in concentrated sulfuric acid at 20° C., the said polymer being a member of the class consisting of (1) a polyamide consisting essentially of the repeating unit

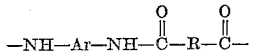

as an integral part of the polymer chain, (2) a polyurethane consisting essentially of the repeating unit

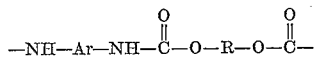

as an integral part of the polymer chain, (3) a polyurea consisting essentially of the repeating unit

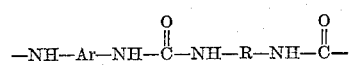

as an integral part of the polymer chain and (4) a polyureylene consisting essentially of the repeating unit

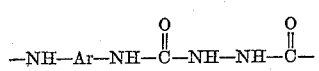

as an integral part of the polymer chain, Ar being arylene and R being a member of the class consisting of arylene and alkylene, (B) a liquid from the class consisting of dimethylformamide, dimethylacetamide, N-methyl-2-pyrrolidone and dimethylsulfoxide, the said polymer (A) having a solubility at 20° C. of at least 0.5% by weight in the said liquid, and (C) from about 0.2% to about 10% by weight based on the said liquid of a salt from the class consisting of calcium bromide, sodium bromide, ammonium bromide, lithium bromide, lithium chloride, calcium chloride, magnesium chloride and strontium chloride, the said salt forming a solution in the said liquid of 1/100 of an equivalent of the said salt in one liter of the said liquid which solution has a specific resistance of less than about 5000 ohm-centimeters at 20° C.

2. The composition of claim 1 wherein the solvent is dimethylformamide.

3. The composition of claim 1 wherein the solvent is dimethylacetamide.

4. The composition of claim 1 wherein the solvent is N-methyl-2-pyrrolidone.

5. The composition of claim 1 wherein the solvent is dimethylsulfoxide.

6. The composition of claim 9 wherein the solvent is dimethylformamide.

7. The composition of claim 6 wherein the salt is lithium chloride.

8. The composition of claim 6 wherein the salt is lithium bromide.

9. The composition of claim 1 wherein the polymer is a polyamide consisting essentially of the repeating unit

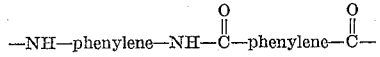

as an integral part of the polymer chain.

10. The composition of claim 9 wherein each pair of —NH— and

substituents is meta oriented on its respective phenylene ring.

11. The composition of claim 10 wherein the said salt is calcium chloride.

12. The composition of claim 11 wherein the said solvent is dimethylacetamide.

References Cited in the file of this patent

UNITED STATES PATENTS

| | | |
|---|---|---|
| 2,359,877 | Schupp | Oct. 10, 1944 |
| 2,716,586 | Terpay | Aug. 30, 1955 |
| 2,749,331 | Breslow | June 5, 1956 |

OTHER REFERENCES

Doolittle: "The Technology of Solvents and Plasticizers," John Wiley and Sons, Inc. (1954), pages 261 and 262 relied upon.